(12) United States Patent
Cowan

(10) Patent No.: US 6,991,584 B2
(45) Date of Patent: Jan. 31, 2006

(54) CONTROL OF POWERTRAIN SMOOTHNESS USING OUTPUT TORQUE SENSING AND INPUT TORQUE CONTROL

(75) Inventor: Ronald Cowan, Rochester Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 77 days.

(21) Appl. No.: 10/706,132

(22) Filed: Nov. 12, 2003

(65) Prior Publication Data

US 2005/0101435 A1     May 12, 2005

(51) Int. Cl.
*B60K 41/04*      (2006.01)

(52) U.S. Cl. .................. 477/110; 477/111; 477/162

(58) Field of Classification Search ............... 477/77, 477/80, 83, 84, 86, 90, 91, 107, 109, 110, 477/111, 115, 162
See application file for complete search history.

(56) References Cited

U.S. PATENT DOCUMENTS

| 4,724,723 | A | * | 2/1988 | Lockhart et al. ........... 477/102 |
| 4,790,418 | A | * | 12/1988 | Brown et al. .............. 701/51 |
| 4,792,902 | A | * | 12/1988 | Hrovat et al. ............. 701/105 |
| 5,609,067 | A | * | 3/1997 | Mitchell et al. ........... 74/336 R |
| 5,629,593 | A | * | 5/1997 | Pollock et al. ............. 318/432 |
| 5,967,942 | A | * | 10/1999 | Yuasa et al. ............... 477/156 |
| 6,077,191 | A | * | 6/2000 | Minowa et al. ............ 477/109 |
| 6,278,926 | B1 | * | 8/2001 | Jain et al. ................. 701/58 |

FOREIGN PATENT DOCUMENTS

| JP | 7-290998 | * | 11/1995 |
| JP | 8-128344 | * | 5/1996 |

* cited by examiner

*Primary Examiner*—Ha Ho
(74) *Attorney, Agent, or Firm*—David B. Kelley; MacMillan, Sobanski & Todd

(57) ABSTRACT

An automatic transmission ratio shift and shift feel control system and method for a powertrain having an engine, multiple-ratio gearing controlled by friction elements actuated by hydraulic pressure, an output shaft torque sensor producing a signal representing the magnitude of current output torque, an electronic controller for controlling the target output torque based on the current output torque, increasing the torque capacity of the oncoming friction element and decreasing the torque capacity of the offgoing friction element after a gear ratio change is initiated. During the inertia phase of the ratio change, the controller controls the engine speed to follow a predetermined rate of change of input speed. The strategy employs an electronic throttle and closed loop engine torque control and closed loop engine speed control at various phases of the gear shift, to improve shift feel. Various engine parameters, including throttle position, ignition timing, engine air-fuel ratio, and engine airflow, control engine torque and speed, are used to control input torque or input speed, depending upon the shift phase.

10 Claims, 3 Drawing Sheets

CONTROL OF POWERTRAIN SMOOTHNESS USING OUTPUT TORQUE SENSING AND INPUT TORQUE CONTROL

BACKGROUND OF THE INVENTION

The invention relates to a system and method for controlling gear shifts in a vehicle power train that includes an engine and an automatic transmission capable of producing multiple gear ratios.

Because shift quality control in automatic transmissions for motor vehicles is attempted using incomplete information from power train sensors, the quality of gear shifts, often called shift feel, produced by automatic transmissions operating under electronic control that employ conventional control strategies often lacks the desired smoothness. There is a continual need to minimize the torque disturbance at the output shaft of an automatic transmission caused by gear shifts. This disturbance often produces noise, vibration and harshness, which is felt by vehicle occupants.

Currently, the primary sensor information used in gear shift control is the transmission input speed and output speed. This information is indirectly used to infer and to control the transmission output torque during gear shifts, which occur as a result of coordinated engagement and disengagement of hydraulically actuated clutches and brakes that alternately connect and release components of planetary gearsets and layshaft gearing. Using control techniques conventionally applied to automatic transmission shift control, the slipping torque capacity of those clutches and brakes is adjusted in real time with reference to speed sensor information.

There is a continual need to minimize the disturbance at the output shaft of an automatic transmission caused by gear shifts. Shift feel can be improved by employing information from an additional sensor, an output shaft torque sensor (OST), which produces a signal representing the actual torque at the transmission output. The new OST sensor in combination with input torque control provide significantly improved shift feel control compared to the results produced by conventional hardware, control strategies, and calibration development techniques currently used for this purpose.

For most gear shifts produced automatically under electronic control, a control employing OST sensor information will produce an output torque magnitude after the gear shift that is equal to the output torque before the shift, eliminate output torque holes during the torque phase of each gear shift, and avoid output torque disturbances during the inertia phase of each gear shift.

Gearshift smoothness is achieved by directly sensing and controlling the power train parameters that the vehicle operator and other occupants actually feel. The resulting output torque it produces stays constant and on-target because output torque is not added or subtracted when decelerating or accelerating engine input inertia torque during upshifts and downshifts. Output torque sensing completes the information required to provide the true, real-time control of gear shift quality, long desired in transmission shift control.

SUMMARY OF THE INVENTION

The powertrain control strategy according to the present invention avoids unwanted output torque disturbance when the control is not performing a gear shift, during the torque phase of the shift, and during the inertia phase of the shift. This invention is applicable to all-synchronous shifting, uses simplified hydraulic controls, and avoids costly one-way clutches, coast clutches and extra controls that are normally required for each non-synchronous gear ratio change.

Because this strategy requires locked shifts or powershift transmissions with a launch clutch, it is a significant fuel economy enabler. Depending upon their location in the power flow and their controllability characteristics, alternative power sources such as electric motors, starter-generators, and hydraulic motors, can be used separately or in combination with the torque control of an internal combustion engine. This technology, therefore, enables continued use of step-ratio transmissions in a powertrain having new torque sources such as electric motors, starter-generators, and hydraulic motors.

A method in accordance with this invention for controlling a gear ratio change from a current gear to a next gear is applicable to an automatic transmission coupled to an engine. The gear shift, or gear ratio change, results by disengaging an offgoing friction element and engaging an oncoming friction element. The transmission has an input, input speed, output, and output torque at the output. The method includes the steps of repetitively determining a target output torque; initiating a gear ratio change from the current gear to the next gear; repetitively increasing a torque capacity of the oncoming friction element toward a magnitude of torque transmitted by the oncoming friction element when the target output torque is produced at the output in the next gear; decreasing a torque capacity of the offgoing friction element to a predetermined torque capacity; producing an indication of the current output torque; and in response to the indication, adjusting an operating parameter of the engine to control the engine torque such that the output torque is maintained at the target output torque, within OST sensor accuracy and system saturation limitations.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
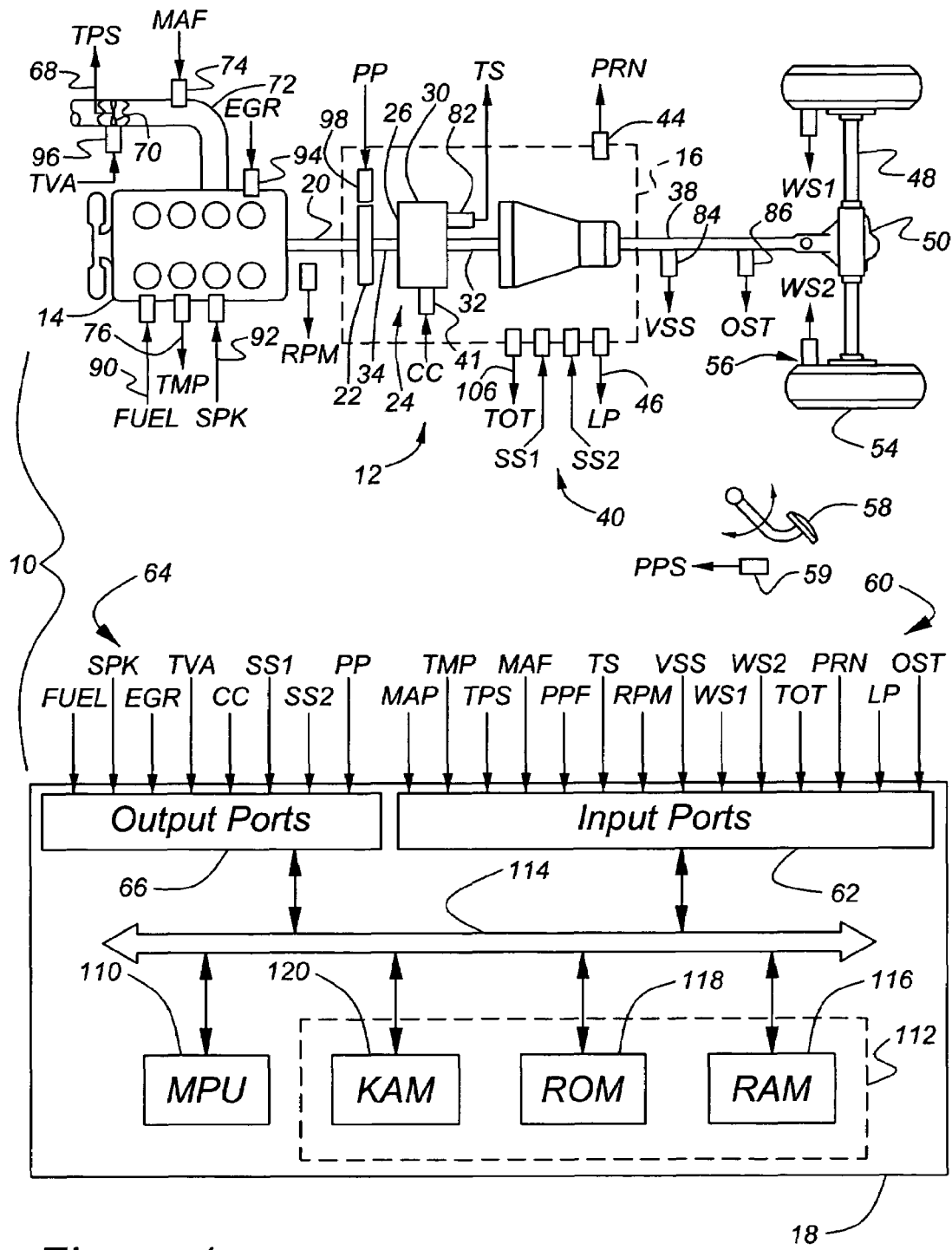
FIG. 1 is a schematic representation of a powertrain for an automotive vehicle including a microprocessor for controlling the vehicle transmission and engine according to this invention.

FIG. 1 is a block diagram illustrating a system 10 for controlling the shifting process downshifts of an automatic transmission according to the present invention. System 10 includes a vehicle power train 12 having an internal combustion engine 14 coupled to an automatic transmission 16. Powertrain 12 may also include a controller 18 in communication with engine 14 and transmission 16 for providing various information and control functions. Engine 14 is connected to transmission 16 via a crankshaft 20, which is connected to transmission pump 22 and/or a torque converter 24. Preferably, torque converter 24 is a hydrodynamic torque converter including an impeller 26, which is selectively, hydrokinetically coupled to a turbine 28. Torque converter 24 may also include a hydraulically actuated friction converter clutch or bypass clutch 30, which releasably connects the turbine shaft 32 and crankshaft 20.

Automatic transmission 16 produces multiple gear ratios by selectively engaging and disengaging various hydraulically actuated friction elements, such as clutches, brakes, and couplers, which establish and disestablish connections among elements of various planetary gearsets or layshaft gearing. The gearing produces selective torque reduction and torque multiplication ratios between turbine shaft 32 and output shaft 38. Automatic transmission 16 is preferably electronically controlled via one or more shift solenoids, indicated generally by reference numeral 40, and a converter clutch control (CC) 41 to select an appropriate gear ratio based on current operating conditions. Transmission 16 also preferably includes an actuator for controlling pump pressure (PP) 42 (or line pressure), in addition to a shift lever position sensor (PRN) 44 to provide an indication of the operator's selected gear or driving mode, such as drive, reverse, park, etc. A line pressure sensor (LP) 46 can be provided to facilitate closed loop feedback control of the hydraulic line pressure during shifting or gear ratio changing.

Depending upon the particular application, output shaft 38 may be coupled to one or more axles 48 via a differential mechanism 50. Each axle 48 may include two or more wheels 54 having corresponding wheel speed sensors 56.

In addition to the sensors described above, powertrain 12 preferably includes a plurality of sensors, indicated generally by reference numeral 60, in communication with corresponding input ports 62 of controller 18 to sense or monitor the current operating and ambient conditions of powertrain 12. A plurality of actuators, indicated generally by reference numeral 64, communicate with controller 18 via output ports 56 to effect control of powertrain 12 in response to commands generated by controller 18.

The sensors preferably include a throttle valve position sensor (TPS) 68, which monitors the position of throttle valve 70, disposed within intake 72. A mass airflow sensor (MAF) 74 provides an indication of the air mass flowing through intake 72. A temperature sensor (TMP) 76 provides an indication of the engine coolant temperature ECT, or alternatively engine oil temperature.

An engine speed sensor (RPM) 80 monitors rotational speed of crankshaft 20. Similarly, a turbine speed sensor 82 monitors the rotational speed of the turbine 28 of torque converter 24. Another rotational speed sensor, vehicle speed sensor (VSS) 84, provides an indication of the speed of output shaft 38, which may be used to determine the vehicle speed based on the gear ratios of the final drive gearset, differential 50, and the size of wheels 54. Of course, wheel speed sensors (WS1 and WS2) 56 may be used to provide an indication of the vehicle speed as well.

Depending upon the particular application requirements, various sensors may be omitted or alternative sensors provided which generate signals indicative of related sensed parameters. Values corresponding to ambient or operating conditions may be inferred or calculated using one or more of the sensed parameters without departing from the spirit or scope of the present invention.

An accelerator pedal 58 is manipulated by the driver to control the output of powertrain 12. A pedal position sensor 59 provides an indication of the position of accelerator pedal 58, preferably in the form of counts, with an increasing number of counts indicating a request for increased power output. The pedal 58 can be used to control the throttle position of an internal combustion engine, an integrated starter generator, hydraulic launch assisted vehicle, an electric motor, or another power source. A manifold absolute pressure (MAP) sensor 74, or equivalent, may be used to provide an indication of the current barometric pressure and manifold pressure. An output shaft torque sensor OST 86 located on the transmission output shaft 38 produces a signal to the controller representing the magnitude of torque transmitted by the output shaft, the actual output torque Actuators 64 are used to provide control signals or to effect movement of various devices in powertrain 12. Actuators 64 include actuators for timing and metering fuel (FUEL) 90, controlling ignition angle or timing (SPK) 92, setting the amount of exhaust gas recirculation (EGR) 94, and adjusting the intake air using throttle valve 70 with an appropriate servomotor or actuator (TVA) 96. As described above, automatic transmission 16 is controlled to produce selectively its various gear ratios by controlling transmission hydraulic line pressure using an appropriate actuator (PP) 42 in combination with clutch pressure control solenoids (SS1 and SS2) 40, which pressurize and vent clutch apply chambers in response to command signals from controller 18. The hydraulic friction clutches and brakes engage and disengage according to the pressurized and vented state of the chambers, whereby the appropriate gear ratio is produced. The terms "friction element" and "clutch" refer interchangeably to a clutch or a brake, and preferably to a hydraulically actuated clutch or brake.

A torque converter clutch locks, unlocks, and produces variable slip across the torque converter clutch 30 in response to a control signal from controller 18 applied to a solenoid (CC) 41, which controls a valve through which the state of the torque converter clutch is changed. Preferably, a temperature sensor 106 produces a signal representing the transmission oil temperature (TOT).

Controller 18 is preferably a microprocessor-based controller, which provides integrated control of the engine 14 and transmission 16 of the powertrain 12. The present invention may be implemented with a separate engine or transmission controller depending upon the particular application. Controller 18 includes a microprocessor 110 in communication with input ports 62, output ports 66, and computer readable media 112 via a data/control bus 114. Computer readable media 112 may include various types of volatile and nonvolatile memory such as random access memory (RAM) 116, read-only memory (ROM) 118, and keep-alive memory (KAM) 120. These functional descriptions of the various types of volatile and nonvolatile storage may be implemented by any of a number of known physical devices including, but not limited to EPROMs, EEPROMs, PROMS, flash memory, and the like. Computer readable media 112 include stored data representing instructions executable by microprocessor 110 to implement the method for controlling hydraulic pressure during shifting according to the present invention.

Figure 3:
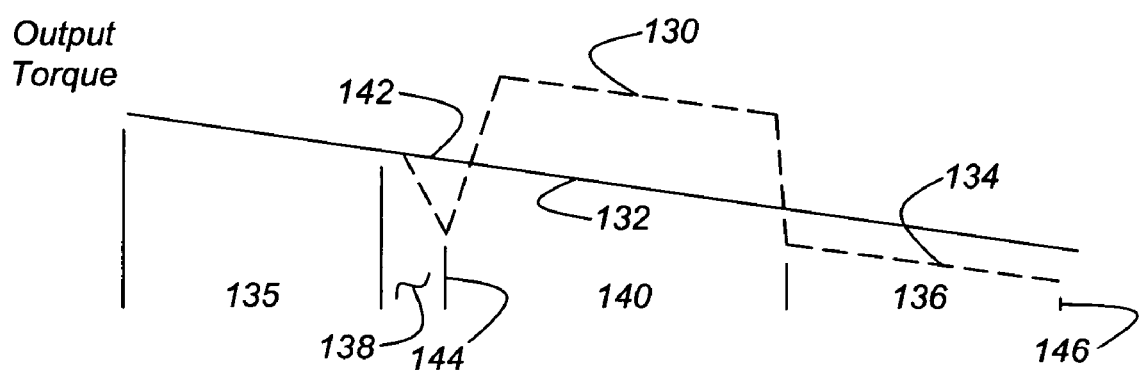
FIG. 3 is a chart that compares the variation with time of transmission output torque immediately before, during, and immediately after a steady-throttle upshift, with and without this invention.

Although the control strategy is described next for an upshift, i.e., a gear ratio change from a lower gear to a higher gear, the same principles apply to downshifts. In FIG. 3, the line 130 shows the variation with time of actual torque at the transmission output shaft 38 immediately before, during, and immediately after a conventional steady-throttle upshift in a powertrain 12. Line 132 represents an ideal trace or trajectory of output torque assuming that optimum powertrain smoothness is achieved by this invention. The magnitude of actual output torque after the shift 134 is lower than the ideal magnitude 132, indicating that the shift was scheduled other than at the equal tractive effort crossover condition, in which the change in engine torque would have compensated for the transmission's gear ratio change. The dominant negative slope of the ideal and actual output torque represents typical constant power output as the vehicle accelerates.

Figure 2:
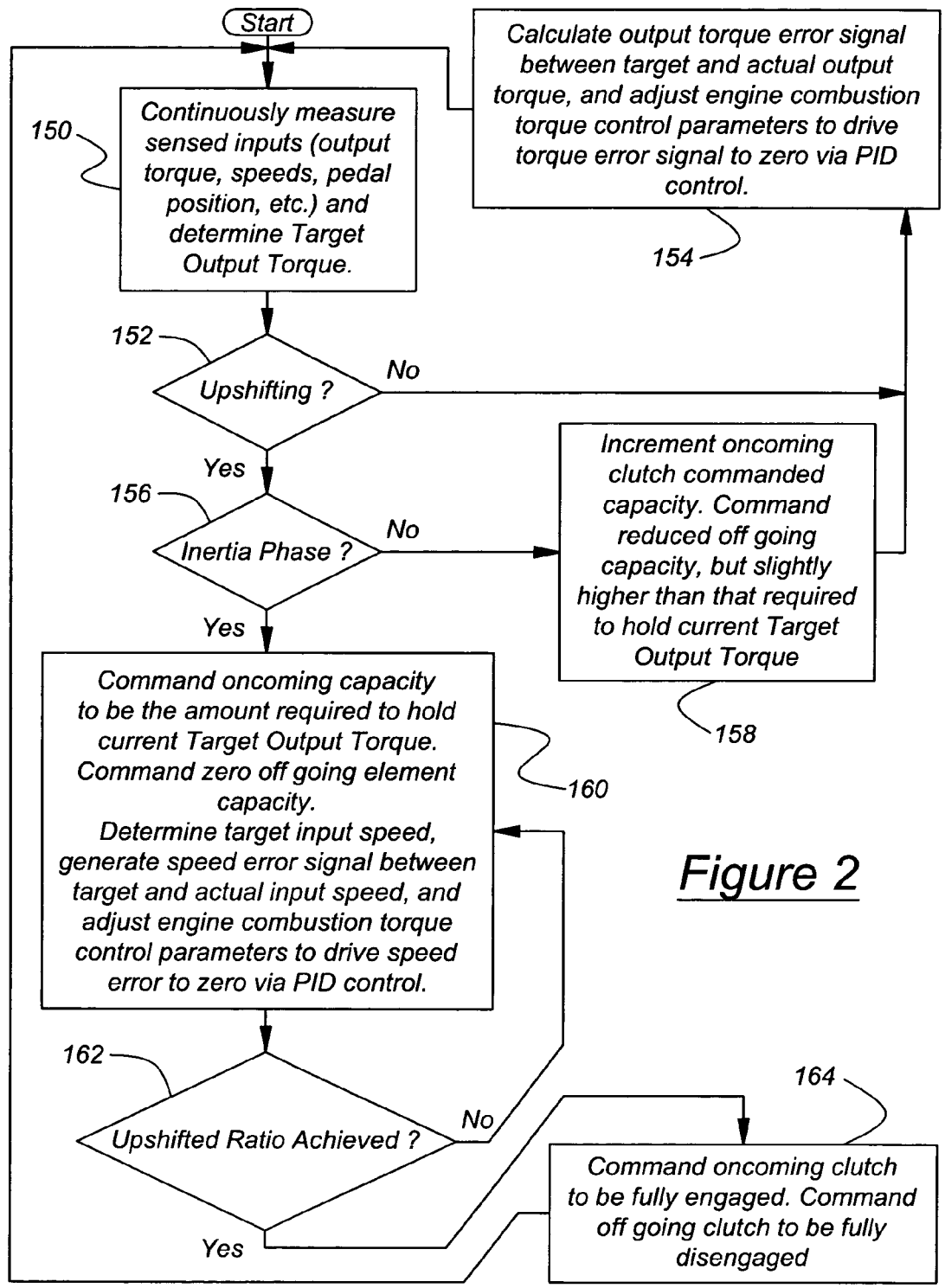
FIG. 2 is flow diagram illustrating the steps of the control method of a typical upshift according to this invention.

Three distinct phases of powertrain control during an upshift according to the present invention are discussed: Before and after an upshift 135 and 136, respectively; during the torque phase 138 of the upshift; and during the inertia phase 140. The steps of the control method according to this invention are summarized in FIG. 2.

During Non-Shifting Operation

While there are no outstanding gear shift commands being executed by controller 18, i.e., when the powertrain is not shifting, the powertrain control algorithms stored in memory 112 continuously determine at 150 the current target output torque and produce a signal representing the target output torque magnitude. Preferably, the target output torque is determined from a look-up table having accelerator pedal position PPS, the position of the gear selector PRN, and vehicle speed VSS as its arguments or indices, preferably not the gear in which the transmission is currently operating. Sensors 59, 44 and 84, respectively, produce signals received by the controller 18 representing the current condition and magnitude of these variables. Alternatively, target output torque can be produced in the controller 18 from an empirically determined regressive polynomial in terms of these three variables set out in the control algorithms. The target output torque signal is generated continuously and sampled repetitively.

In response to the target output torque signal, the engine controller produces the magnitude of engine output torque that corresponds to the target output torque magnitude at output shaft 38 upon considering the current gear ratio and the torque multiplication, if any, currently produced by the torque converter 24. The torque produced by an internal combustion engine power source is controlled by manipulating any of various engine parameters including engine speed, engine airflow, the throttle position of the engine, ignition timing, and engine air-fuel ratio. In certain instances, the engine controller is more particularly called the input torque controller (ITC).

At 152, an inquiry is made to determine whether the transmission is producing an upshift. If that test is logically false, control passes to 154, where the controller 18 samples the OST signal produced by the output torque sensor 86 and uses the OST signal to generate an error signal equal to the difference between actual and target output torque. During each execution of the control algorithms, the controller repetitively reduces this error signal to zero or an acceptable threshold magnitude using a proportional, integral, differential PID formula, and changes engine output torque by changing appropriate engine parameters such as throttle position, fuel, spark advance with controller PID gains calibrated for stable, responsive control of output torque. Within saturation limits, the controller matches before-shift and after-shift actual output torque, and target output torque, regardless of the shift point. The controller matches the torque magnitude produced by the engine shaft and transmitted to the turbine shaft or transmission input shaft 32 with the output torque magnitudes on shaft 38.

General Summary of Output Torque Control During Shifts

If the test at 152 is logically true, control passes to 156, where a test is made to determine whether the upshift is in the inertia phase. The outcome of test 156 is true if the gear ratio has started to decrease, or if the actual oncoming clutch capacity has been raised to the magnitude required to hold current target output torque.

If test 156 is logically false, at 158 the controller increments oncoming clutch commanded capacity, and commands a reduced offgoing clutch capacity slightly greater than that required to hold the current target output torque. Then control passes to 154. If the test at 156 is true, control passes to 160 where the controller commands the oncoming clutch torque capacity to be the magnitude required to hold current target output torque, and commands zero offgoing element capacity. The controller determines the target input speed, generates a speed error signal between target and actual input speeds, and adjusts engine combustion torque control parameters so that the speed error is reduced to zero by the PID control.

Then at 162, an inquiry is made to determine, on the basis of the transmission gear ratio calculated from the speed sensor signals, whether the upshift gear ratio has been achieved. If the test at 162 is false, control returns to 160. If the test at 162 is true, the controller commands the oncoming clutch to fully engage, and commands the offgoing clutch to fully disengage. Then the upshift is completed, and control returns to restart execution of the control strategy algorithm.

The commands produced by the controller to change the torque capacities of the oncoming and offgoing clutches are executed in response to command signals SS1 and SS1 received by solenoid-controlled valves that respond to the command signals by increasing pressure to the oncoming friction element and decreasing pressure to the offgoing friction element. Toward the end of the gear shift the controller determines a target engine speed, adjusts engine operating parameters to change engine speed to the target speed, and fully engages the oncoming friction element at by updating the command SS1 to the solenoid that controls the oncoming friction element. A more specific description of the control strategy during each the torque phase and inertia phase of an upshift follows.

During Upshift Torque Phase

The upshift torque phase 138 begins when the controller commands an upshift to occur in response to a result produced by the shift scheduling portion of the control algorithms. The new strategy begins the shift by increasing the torque capacity of the oncoming clutch at a predetermined, calibrated or learned time rate of increase. Preferably, the rate of increase of oncoming clutch torque is as high as possible to provide the shortest possible torque phase, but not so high as to exceed the response capability of the ITC to continue to hold output torque error near zero via the PID controller, as described above with reference to non-shifting operation. The duration of the torque phase of a gear shift is determined by the time rate of increase of the oncoming clutch torque capacity. The degree to which output torque would otherwise decline is a function of the ratio of the gear ratios of the current gear and next gear.

The controller 18 responds to the command for an upshift by producing a signal output to the one of the shift solenoids SS1 or SS2 that is associated with the oncoming clutch. The solenoid responds to the PWM signal by changing the state of a valve, thereby opening a source of hydraulic pressure to a hydraulic clutch apply chamber, through which the oncoming clutch is pressurized. Hydraulic pressure in the apply chamber forces the spacer plates and friction discs of the clutch into frictional contact, which causes the torque capacity of the clutch to increase at a time rate consistent with the magnitude of the signal. The clutch becomes fully engaged when the plates and discs rotate at the same speed without slip. The torque capacity of the clutch increases at a rate determined by the normal force on the clutch plates and discs. U.S. Pat. No. 5,157,608, which is incorporated herein by reference, describes and illustrates hydraulically actuated clutches and brakes of the type to which the control of this invention can be applied.

As the oncoming element gains torque capacity, the magnitude of torque transmitted across the offgoing clutch approaches zero as the torque ratio of the transmission approaches the torque ratio that would be produced at the conclusion of the upshift. With the accelerator pedal 58 position PPS constant, if input torque were held constant, output torque would decrease due to the torque ratio change produced by the transmission 16. However, the control strategy of this invention continues to operate under control of the ITC during the torque phase of the gear shift, thereby accurately manipulating combustion torque of the engine via PID control, and continuing to produce the Target Output Torque 142 during the torque phase.

The end of the torque phase 144 is reached when the magnitude of torque transmitted by the offgoing clutch reaches zero, and the torque ratio between the input shaft 32 and output shaft 38 reaches the torque ratio of the next gear. At exactly this point, the still slipping oncoming element is transmitting exactly that magnitude of torque required for the transmission to transmit target output torque to output shaft 38. The control strategy infers the occurrence of the end of the torque phase, preferably by inferring and learning the dynamic commanded compared to the actual capacity relationship for the oncoming clutch.

During the period while the torque capacity of the of the oncoming element is increasing, the torque capacity of the offgoing element is unimportant to performance of the powertrain, as long as the offgoing clutch does not slip. If the torque capacity of a clutch exceeds the magnitude of torque that it transmits, the clutch will not slip. But to prepare for quickly decreasing the torque capacity of the offgoing clutch at the end of the torque phase, the control strategy preferably reduces the torque capacity of the offgoing clutch to a magnitude slightly above the magnitude of the torque it transmits, based on the inferred capacity of the oncoming clutch.

During Inertia Phase

At the end of the torque phase 144, because the offgoing clutch is transmitting zero torque, it can quickly be disengaged or released without affecting output torque. At the end of the torque phase, the torque capacity of the oncoming clutch is exactly the magnitude of torque it needs to transmit target output torque on the output shaft 38, according to the location of the oncoming clutch in the transmission's power flow. Output torque is not affected by input torque during the inertia phase; output torque is affected only by the torque capacity of the oncoming clutch, as long as the oncoming clutch is slipping.

At this point in the upshift, conventional transmission controls and strategy would command a further increase of the oncoming clutch's torque capacity at the end of the torque phase in order to generate additional engine inertia torque (the product of engine inertia and angular acceleration of the engine) needed to complete the gear ratio change within an acceptable period. But increasing the oncoming clutch's torque capacity at this point increases output torque, causing excessive output torque 130. The control according to this invention does not increase the torque capacity of the oncoming clutch greater than its torque capacity at the bottom of torque phase. Instead, it maintains the oncoming clutch's torque capacity constant, maintains target output torque constant, and responds only to changes in target torque caused by changes in the position of the accelerator pedal 58. But this response to a target torque change does not exceed the ITC's capability to control input speed, as described below.

At the beginning of the inertia phase 144, the ITC changes from a real-time output torque PID controller to a real-time input speed PID controller, and continues as a speed controller until the gear shift and inertial phase are completed at 146. During the inertia phase, the ITC does not control the magnitude of input and output torque because the torque capacity of the oncoming (slipping) clutch determines the magnitude of input torque.

Combustion torque is controlled by the ITC to cause the speed of input shaft 32 to follow a target speed determined by the control strategy. Initially the target speed is high negative rate in order to complete the gear shift within an acceptable period. The control very slowly reduces oncoming clutch slip at the end of the inertia phase in order to produce smooth state changes back to the non-shifting mode. The more slowly slip across the oncoming clutch approaches zero, the closer the ITC will set the final throttle position magnitude to the exact throttle position magnitude required to produce target output torque after the shift. When the inertia phase is over, as determined by the controller comparing the current gear ratio produced by the transmission to the gear ratio of the next gear, the ITC returns to controlling output torque to the magnitude corresponding to the target output torque. With the position of the accelerator pedal 58 constant, by holding its capacity constant, the new strategy provides constant, on-target output torque throughout the inertia phase 140.

One commercially available technology for the transmission output torque sensor itself uses strain gauges and slip rings on the output shafts. The preferred, more robust, non-contacting systems detect magnetic field alignment changes as a technique to measure and provide a signal proportional to shaft torque, such as the system described in SAE Paper 2003-01-0711, the 'Torducer' System provided by ABB Automation Products AB, Vasteras, Sweden. Magna-lastic Devices, Inc. provides a similar system. Another torque-sensing technology involves Surface Acoustic Wave (SAW) sensing systems.

Based upon results produced by a mathematical model, acceptable results would be produced by the control strategy of this invention provided that output torque is maintained at the target output torque within an accuracy of +/−2 percent system accuracy under static conditions, and +/−10 percent system accuracy under dynamic conditions. The bases for these estimates include shift-to-shift repeatability of 2 percent, and a sensor signal-to-noise ratio of about 100 over the entire torque range.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A system for controlling gear ratio changes, comprising:
   an internal combustion engine having an engine speed and engine torque;
   an automatic transmission driveably coupled to the engine, the transmission having an input, input speed, output, and output torque at the output, an offgoing friction element, an oncoming friction element, a current gear, and a next gear, produced by disengaging the offgoing friction element and engaging the oncoming friction element;

a torque sensor secured to the output for producing an indication of the magnitude of a current output torque; and a controller for determining a target output torque, increasing a torque capacity of the oncoming friction element toward a magnitude of torque carried by the oncoming friction element when the target output torque is produced at the output in the next gear, decreasing a torque capacity of the offgoing friction element clutch to a predetermined torque capacity, and in response to the indication, adjusting an operating parameter of the engine to control the engine torque such that the output torque is maintained at or below the target output torque.

2. The system of claim 1, further comprising:

a first sensor producing a signal representing the position of an accelerator pedal;

a second sensor producing a signal representing a current vehicle speed; and wherein the controller determines the target output torque with reference to the position of an accelerator pedal and current vehicle speed.

3. The system of claim 1, wherein:

the controller further comprises determining the magnitude of torque transmitted by the offgoing friction element when the target output torque is produced at the output in the current gear, and decreasing the torque capacity of the offgoing friction element to a magnitude that is equal to or greater than the magnitude of torque transmitted by the offgoing friction element when the target output torque is produced at the output in the current gear.

4. The system of claim 1, wherein:

the controller further comprises decreasing the torque capacity of the offgoing friction element to a magnitude such that the offgoing friction element does not slip when the target output torque is produced at the output in the current gear.

5. The system of claim 1, wherein:

the controller further comprises producing an second indication when the magnitude of torque transmitted by the offgoing friction element reaches zero while the target output torque is produced at the output in the current gear, producing a third indication when a current gear ratio produced by the transmission is substantially equal to the gear ratio produced by the transmission in the next gear, and decreasing the torque capacity of the offgoing friction element when the second and third indications are present.

6. The system of claim 1, wherein:

the controller further comprises producing an second indication when the magnitude of torque transmitted by the offgoing friction element reaches zero while the target output torque is produced at the output in the current gear, producing a third indication when a current gear ratio produced by the transmission is substantially equal to the gear ratio produced by the transmission in the next gear, and adjusting the operating parameter of the engine to control the engine speed to a predetermined speed when the second and third indications are present.

7. The system of claim 1 wherein the engine operating parameter adjusted by the controller is an engine airflow.

8. The system of claim 1 wherein the engine operating parameter adjusted by the controller is a throttle position of the engine.

9. The system of claim 1 wherein the engine operating parameter adjusted by the controller is an ignition timing.

10. The method of claim 1 wherein the engine operating parameter adjusted by the controller is an engine air-fuel ratio.

\* \* \* \* \*